(12) United States Patent
Roberts

(10) Patent No.: US 8,625,083 B2
(45) Date of Patent: Jan. 7, 2014

(54) THIN FILM STRESS MEASUREMENT 3D ANISOTROPIC VOLUME

(75) Inventor: Ken Roberts, Celebration, FL (US)

(73) Assignee: Ken Roberts, Celebration, FL (US)

(*) Notice: Subject to any disclaimer, the term of this patent is extended or adjusted under 35 U.S.C. 154(b) by 90 days.

(21) Appl. No.: 13/046,722

(22) Filed: Mar. 12, 2011

(65) Prior Publication Data

US 2012/0229794 A1      Sep. 13, 2012

(51) Int. Cl.
*G01B 11/16*           (2006.01)

(52) U.S. Cl.
CPC ...................... *G01B 11/16* (2013.01)
USPC .......................................................... 356/32

(58) Field of Classification Search
CPC ....................................................... G01B 11/16
USPC ....................................................... 356/32–44
See application file for complete search history.

(56) References Cited

U.S. PATENT DOCUMENTS

| | | | | |
|---|---|---|---|---|
| 5,633,711 | A * | 5/1997 | Nelson et al. ................. | 356/318 |
| 7,126,699 | B1 * | 10/2006 | Wihl et al. ..................... | 356/625 |
| 7,136,163 | B2 * | 11/2006 | Borden et al. ................. | 356/369 |
| 7,487,675 | B2 * | 2/2009 | Ikawa et al. ................... | 73/204.26 |
| 7,966,135 | B2 * | 6/2011 | Rosakis et al. ................. | 702/42 |
| 2001/0028460 | A1 * | 10/2001 | Maris et al. ................... | 356/432 |
| 2005/0036151 | A1 * | 2/2005 | Gornick et al. ............... | 356/497 |
| 2005/0146708 | A1 * | 7/2005 | Shi et al. ....................... | 356/35.5 |
| 2007/0180919 | A1 * | 8/2007 | Rosakis et al. ................ | 73/760 |

\* cited by examiner

*Primary Examiner* — Michael P Stafira

(57) ABSTRACT

A system for measuring thin film stress, anisotropic or isotropic, such as from thin film deposition onto semiconductor substrates found in semiconductor manufacturing. The system uses resettled volume difference, $V_2-V_1$, of the surface of a material to calculate stress. The system includes a means to collect 3D surface points, a method to calculate volume and a method to calculate thin film stress from resettled volume difference. Calculating stress from resettled volume difference, $V_2-V_1$, eliminates the inaccuracy of calculating stress from the change in surface curvature or surface radius with equations such as $$\left(\frac{1}{R_2} - \frac{1}{R_1}\right).$$

The inaccuracy of stress calculated from surface curvature is from the non-spherical deformation of anisotropic materials, such as semiconductor substrates, eg: silicon wafers in semiconductor manufacturing.

1 Claim, 6 Drawing Sheets

$$h = 2\beta\left(\frac{\Delta X}{\Delta Z}\right) \pm \sqrt{\left(2\beta\frac{\Delta X}{\Delta Z}\right)^2 - y^2}$$

$eg:$ $$h = 2 \times 300 \times \left(\frac{50}{1.5}\right) \pm \sqrt{\left(2 \times 300 \times \frac{50}{1.5}\right)^2 - 50^2}$$

$$h = 20,000 - \sqrt{399,997,500} = 20,000 - 19,999.9375 = 0.0625$$

FIG 7

$v1 = unstressed\_volume = sum\_of\_unstressed\_volume\_sections$ $v1 = v1.1 + v1.2 + .. + v1.n$ $v1_{section} = v1.n$ $v1_{section} = v1_{circumscribed\_cylinder} \times \left(\dfrac{1}{2}\right) \times \left(\dfrac{1}{numberof\ sections}\right)$ $v1.3 = \pi r^2 \left(\dfrac{v1h180 + v1h270}{2}\right)\left(\dfrac{1}{2}\right)\left(\dfrac{1}{4}\right)$  $\qquad$  $v1.2 = \pi r^2 \left(\dfrac{v1h90 + v1h180}{2}\right)\left(\dfrac{1}{2}\right)\left(\dfrac{1}{4}\right)$ $v1.3 = 7854 \times 0.006 \times \dfrac{1}{2} \times \dfrac{1}{4} = 5.89$  $\qquad$  $v1.2 = 7854 \times 0.006 \times \dfrac{1}{2} \times \dfrac{1}{4} = 5.89$

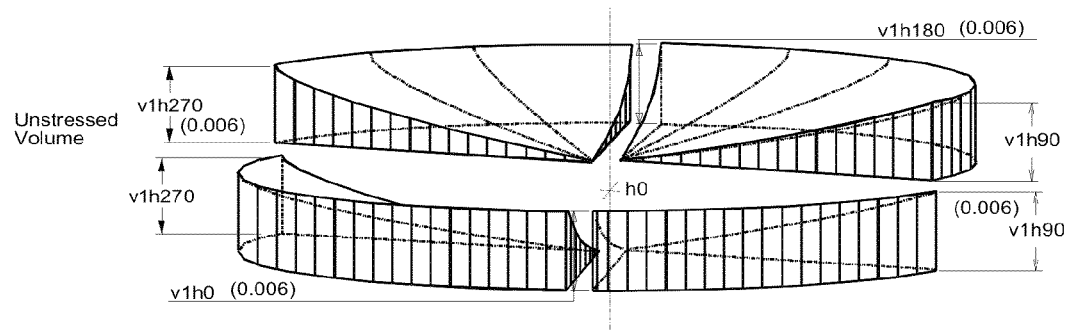

$v1.4 = \pi r^2 \left(\dfrac{v1h270 + v1h0}{2}\right)\left(\dfrac{1}{2}\right)\left(\dfrac{1}{4}\right)$  $\qquad$  $v1.1 = \pi r^2 \left(\dfrac{v1h0 + v1h90}{2}\right)\left(\dfrac{1}{2}\right)\left(\dfrac{1}{4}\right)$ $v1.4 = 7854 \times 0.006 \times \dfrac{1}{2} \times \dfrac{1}{4} = 5.89$  $\qquad$  $v1.1 = 7854 \times 0.006 \times \dfrac{1}{2} \times \dfrac{1}{4} = 5.89$

*typ.*

$v2 = stressed\_volume = sum\_of\_stressed\_volume\_sections$ $v2 = v2.1 + v2.2 + ... + v2.n$ $v2_{section} = v2.n$ $v2_{section} = v2_{circumscribed\_cylinder} \times \left(\frac{1}{2}\right) \times \left(\frac{1}{number of sections}\right)$ $v2.3 = \pi r^2 \left(\frac{v2h180 + v2h270}{2}\right)\left(\frac{1}{2}\right)\left(\frac{1}{4}\right)$     $v2.2 = \pi r^2 \left(\frac{v2h90 + v2h180}{2}\right)\left(\frac{1}{2}\right)\left(\frac{1}{4}\right)$ $v2.3 = \pi r^2 \left(\frac{-0.048 + -0.071}{2}\right)\left(\frac{1}{2}\right)\left(\frac{1}{4}\right)$     $v2.2 = \pi r^2 \left(\frac{-0.069 + -0.048}{2}\right)\left(\frac{1}{2}\right)\left(\frac{1}{4}\right)$ $v2.3 = 7854 \times (-0.0595) \times \frac{1}{2} \times \frac{1}{4} = -58.41$     $v2.2 = 7854 \times (-0.0685) \times \frac{1}{2} \times \frac{1}{4} = -67.25$

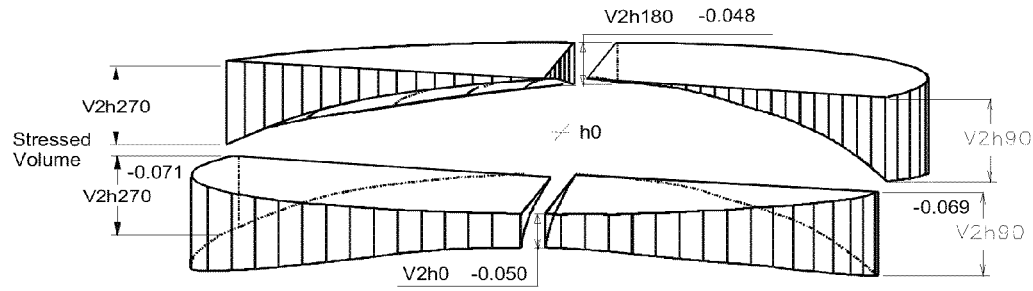

$v2.4 = \pi r^2 \left(\frac{v2h270 + v2h0}{2}\right)\left(\frac{1}{2}\right)\left(\frac{1}{4}\right)$     $v2.1 = \pi r^2 \left(\frac{v2h0 + v2h90}{2}\right)\left(\frac{1}{2}\right)\left(\frac{1}{4}\right)$ $v2.4 = \pi r^2 \left(\frac{-0.071 + -0.050}{2}\right)\left(\frac{1}{2}\right)\left(\frac{1}{4}\right)$     $v2.1 = \pi r^2 \left(\frac{-0.050 + -0.069}{2}\right)\left(\frac{1}{2}\right)\left(\frac{1}{4}\right)$ $v2.4 = 7854 \times (-0.0605) \times \frac{1}{2} \times \frac{1}{4} = -59.4$     $v2.1 = 7854 \times (-0.0595) \times \frac{1}{2} \times \frac{1}{4} = -58.41$ typ.

$v2 = v2.1 + v2.2 + v2.3 + v2.4 = (-58.41) + (-67.25) + (-58.41) + (-59.4) = (-243.48)$ $s = \left(\frac{c \times ts^2}{6 \times tf}\right) \times \left(\frac{4}{\pi r^4}\right) \times (v2 - v1)$ $s = \left(\frac{180500 \times 0.55^2}{6 \times 6000 \times 0.0000001}\right) \times \left(\frac{4}{\pi \times 50^4}\right) \times (-243.48 - 23.56)$ $s = \left(\frac{54,601}{0.0036}\right) \times 0.0000002037 \times (-267.04) = -825 Mpa$

THIN FILM STRESS MEASUREMENT 3D ANISOTROPIC VOLUME

DESCRIPTION OF DRAWINGS

The present invention can be better understood by referencing the following description of drawings, which illustrate the embodiment of the invention.

4a   Last $\{x_n, y_n, z_n\}$ point of the 90 degree path (d90) on the unstressed surface (s1)
4b   The unstressed substrate (s1)
4c   Volume ($V_1$), contained within reference plane (p), perimeter (c) and (s1)
4d   Reference plane (p)
4e   Volume ($V_2$), contained within reference plane (p), perimeter (c) and (s2)
4f   Stressed substrate surface (s2)
4g   Last point $\{x_n, y_n, z_n\}$ of the 90 degree path (d90) on the stressed surface (s2)
4h   First point $\{x_1, y_1, z_1\}$ of the 0 degree path (d0) on the stressed surface (s2)
4i   Origin $\{0, 0, 0\}$
4j   Last point $\{x_n, y_n, z_n\}$ of the 0 degree path (d0) on the stressed surface (s2)
4k   First point $\{x_1, y_1, z_1\}$ of the 90 degree path (d90) on the stressed surface (s2)
4L   First point $\{x_1, y_1, z_1\}$ of the 0 degree path (d0) on the unstressed surface (s1)
4m   Notch (or flat) location
4n   Last point $\{x_n, y_n, z_n\}$ of the 0 degree path (d0) on the unstressed surface (s1)
4o   First point $\{x_1, y_1, z_1\}$ of the 90 degree path (d90) on the unstressed surface (s1)
4p   Circumscribed perimeter (c)

Figure 5:
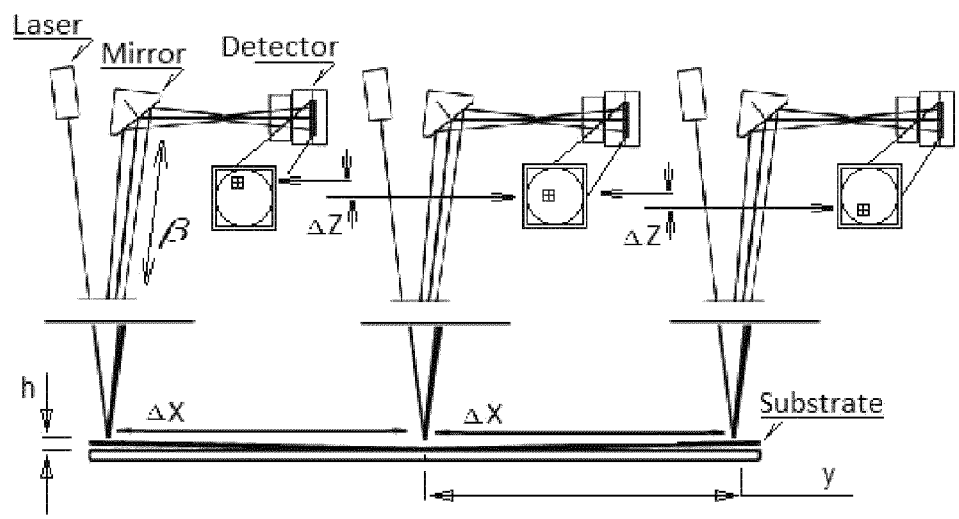

FIG. 5 illustrates a Surface Shape (Deformation) Detector assembly (SSD). The surface height and twist are detected from the location of the image on the detector, reflected from the surface of the substrate material or body, isotropic or anisotropic. The location of the image on the sensor and the location of the image on the substrate surface is transposed into a 3D {xyz} point position. An example calculates the height 50 mm from the center. Height at the center is 0. The substrate rotates 90 degrees, with respect to the SSD assembly, to capture the next intersecting set of points. The configuration of SSD assemblies is a system parametric.

Figure 6:
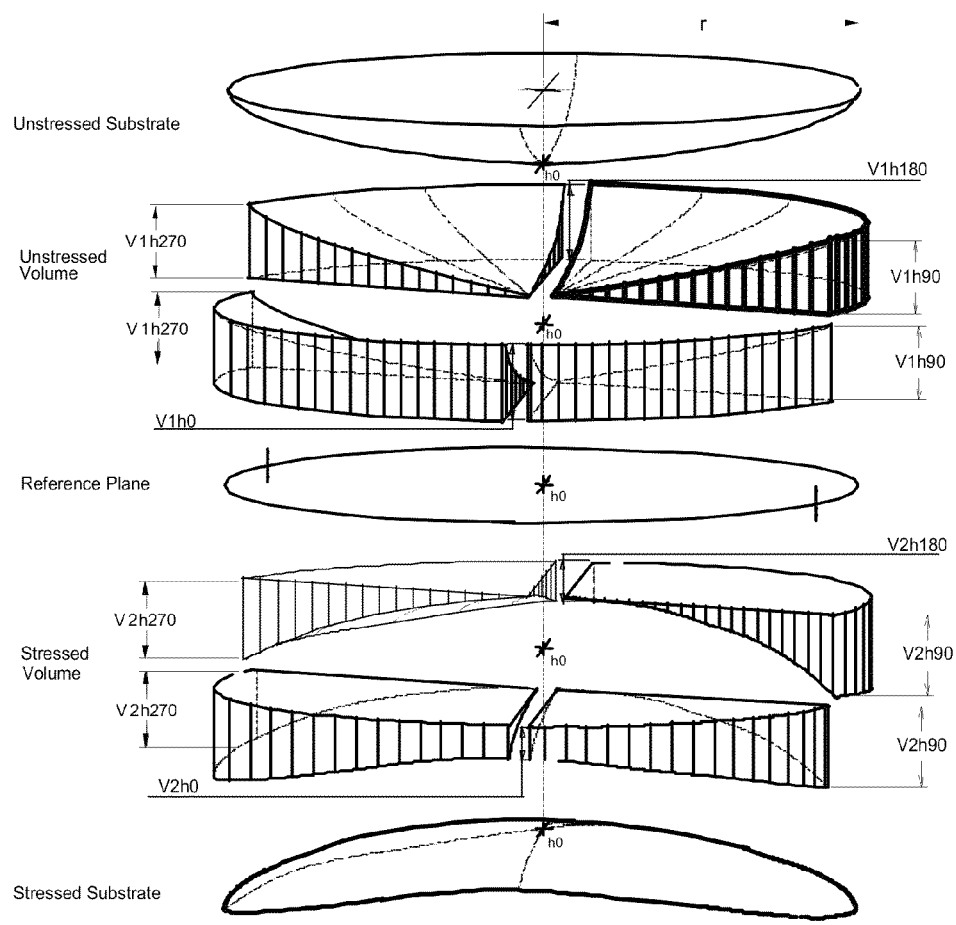

FIG. 6 illustrates the surface and volume models in an exploded view. This basic example divides volume into 4 sections, or cells. The corner of each cell has been measured with the device in FIG. 5. The height of the unstressed volume is magnified more for a better illustration. This basic form of VDT eliminates most of the error associated with the curvature method. Collecting more measurements and volume cells increases accuracy.

FIG. 7 illustrates and calculates the volume occluded by the unstressed surface. Each volume section is calculated with $$v1_{section} = v1_{circumscribed\_cylinder} \times \left(\frac{1}{2}\right) \times \left(\frac{1}{number of \text{ sections}}\right).$$

Volume occluded by the unstressed substrate is the sum of the volume sections, $v1=v1.1+v1.2+ \ldots +v1.n$.

FIG. 8 illustrates and calculates the volume occluded by the stressed surface then calculates the stress using the stressed and unstressed volume (calculated in FIG. 7). Each volume section is calculated with $$v2_{section} = v2_{circumscribed\_cylinder} \times \left(\frac{1}{2}\right) \times \left(\frac{1}{number of \text{ sections}}\right).$$

Volume occluded by the stressed surface is the sum of the volume sections, $v2=v2.1+v2.2+ \ldots +v2.n$. Stress is calculated with $$s = \left(\frac{c \times ts^2}{6 \times tf}\right) \times \left(\frac{4}{\pi r^4}\right) \times (v2 - v1).$$

TECHNICAL FIELD

The present invention generally relates to thin film stress measurement of thin films deposited onto anisotropic (or isotropic) materials such as from film deposition onto silicon substrates used in building semiconductor devices.

BACKGROUND OF INVENTION

Semiconductor substrates such as silicon and III-V materials (cg: GaAs) are the foundation for building semiconductor devices. This discussion will refer to silicon for its popularity and anisotropic properties; however, the reference to the material 'silicon' can be replaced with any material type (isotropic or anisotropic). Semiconductor substrates such as silicon are crystal lattice structures. Silicon conducts electricity in a very controlled manner relative to the impurities put into its crystal lattice structure making silicon an excellent surface to build electronic devices on. Semiconductor wafers are cut from ingots. Ingots are made from pure polysilicon (polycrystalline silicon) chips (processed from sand) and melted at high temperatures (eg, 1400c). A single crystal (seed) is lowered into molten silicon contained in a pure argon gas. A small amount of silicon rises with the rotating silicon seed and cools into a perfect monocrystalline ingot (Single Crystal Silicon Ingot). A silicon crystal is anisotropic, meaning its elastic (stiffness) properties are directionally dependent. Semiconductor substrates, called wafers, are cut from the ingot, machined and polished. An orientation mark (flat or notch) is made on the wafer edge indicating the orientation the wafer is cut relative to the crystal (crystallographic) orientation in the ingot. The orientation is noted as the substrate type (eg: Si<100> or Si<111>) described by Miller Indices. The anisotropicity of the crystal causes non-spherical deformation of semiconductor substrates (eg: silicon wafers) from stress, regardless of the orientation the wafer is sliced from the ingot however the stiffness (stress constant) is different for different wafer types (eg: Si<100>=180500, Si<111>=229200) and required in the stress equation.

The traditional (practiced) method of determining the stress in a thin film is by measuring the change in the curvature of a substrate the film is deposited onto. The radii of the surface before film deposition ($R_1$) and after film deposition ($R_2$) can be measured with an apparatus such as 'Cheng 201' (Cheng, 1993, U.S. Pat. No. 5,233,201). The radius of curvature can be calculated from 2 surface points using equation (1) $R=2b(\Delta x/\Delta z)$:

(1) $R=2b(\Delta x/\Delta z)$ $$R = 2b\Delta x/\Delta z \quad (1)$$

eg: (2×300 mm×80 mm)/2.4 mm=20000 mm or 20 meters

The unstressed and stressed radius values ($R_1$, $R_2$) are used to calculate film stress ($\sigma$) Young's modulus (or tensile modulus, $E_s$) and Poisson's Ratio (v), named after Simeon Poisson, associate a stress constant ($C=E_s/(1-v)$) to a substrate material type. The stress constant is used in the Stoney equation. Equation (2) Stoney Curvature is for a spherical shape with the same curvature across any section of the surface (any 2 points).

(2) Stoney Curvature $$\sigma = \left(\frac{ct_s^2}{6t_f}\right) \times \left(\frac{1}{R_2} - \frac{1}{R_1}\right) \quad (2)$$

eg: $\sigma = \left(\frac{180500 \times 0.55^2}{6 \times 6000_{angstroms} \times 0.0000001}\right) \times \left(\frac{1}{20000} - \frac{1}{-200000}\right)$ = 834 Mpa Calculating stress of a thin film deposited onto an anisotropic substrate (eg: silicon) from curvature, conflicts with the definition of anisotropic materials. A discrepancy in stress measurement occurs from the non-spherical deformation of anisotropic polycrystalline substrates such as silicon noted in 'G. C. A. M. Janssen, et al., Thin Solid Films (2008)'. The deformation of anisotropic substrates is described as the shape of a cylinder on its side, a saddle, potato chip and other (non spherical) shapes.

Building circuits on semiconductor substrates includes lithography, film deposition, etching, etc. to build patterns of circuitry (circuit architecture) that build complete circuits. Film thickness ranges from a few hundred to thousands of angstroms (eg: 500a to 15000a). The atomic structure of the substrate and the deposited films are different and cause stress from the different thermal expansion rates and elevated temperature of the film deposition process. Specifically, one material shrinks more than the other after film deposition causing stress. Stress causes the films to delaminate (peel, crack) and circuits in the devices (called 'Die') to fail. The lower yield raises the cost per device making it important to monitor thin film stress.

The discrepancy (inaccuracy) in 'film stress measurements from curvature' on anisotropic substrates can be observed using a film stress measurement tool (that calculates stress from curvature) and performing pre and post measurements at different surface locations (different angles related to the notch orientation or different distances from the substrate center). Both stress measurement methods (stress calculated from curvature and volume) are performed in FIG. 1 and FIG. 2. The 'stress calculated from curvature' changes when the curvature measurement points change. The 'stress calculated from volume' does not change as the substrate orientation changes. Another approach to correct the (curvature) discrepancy of anisotropic deformation is to mathematically combine radii samples from different areas of the substrate. The problem arises in (2) Stoney Curvature when the radius ($R_1$ or $R_2$) result=0. Specifically, if R=0 then 1/0=NaN (Not a Number), generating an error. Generally, selecting different points to calculate curvature (by rotating the wafer or positioning the points closer or further from the substrate center) derive different radii values that resolve different 'stress calculated from radius' values. The resettled volume difference technique (VDT) uses volume that remains continuously accurate at any orientation or starting point.

Figure 1:
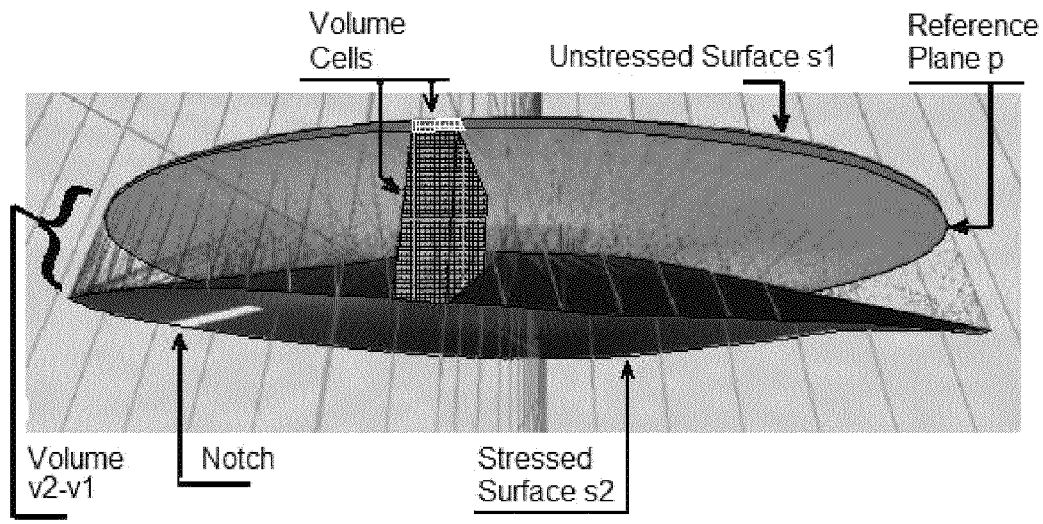
FIG. 1 is a captured image (from BowOptics' 3D-IME, Integrated Magnification Environment) of an anisotropic 100 mm silicon substrate orientated with the notch at 261 degrees (before and after film deposition). The height axis is magnified 200× showing the anisotropic deformation of silicon from film stress. The stress calculation includes a film thickness of 7045 angstroms and substrate thickness of 0.56 mm. Two methods are used to measure stress. Equation (2) Stoney Curvature uses curvature at 261 degrees where $R_1=-155.7$ m and $R_2=-17.66$ m, resolving—672 Mpa. Equation (5) Stoney Volume, uses volume where $V_1=-23.8$ mm$^3$ and $V_2=-234.8$ mm$^3$, resolving −575 Mpa. The Reference Plane p is an imaginary plane the diameter of the substrate. The Unstressed Substrate and Stressed Substrate are the same substrate before and after thin film deposition. Resettled Volume Difference or 'Volume $V_2-V_1$' is the volume displaced in the geometric container after stress is applied from film deposition. The Flat (or Notch) position is the location of the orientation notch or flat cut in the substrate. The volume cells are 3 degrees×10 mm.
Figure 2:
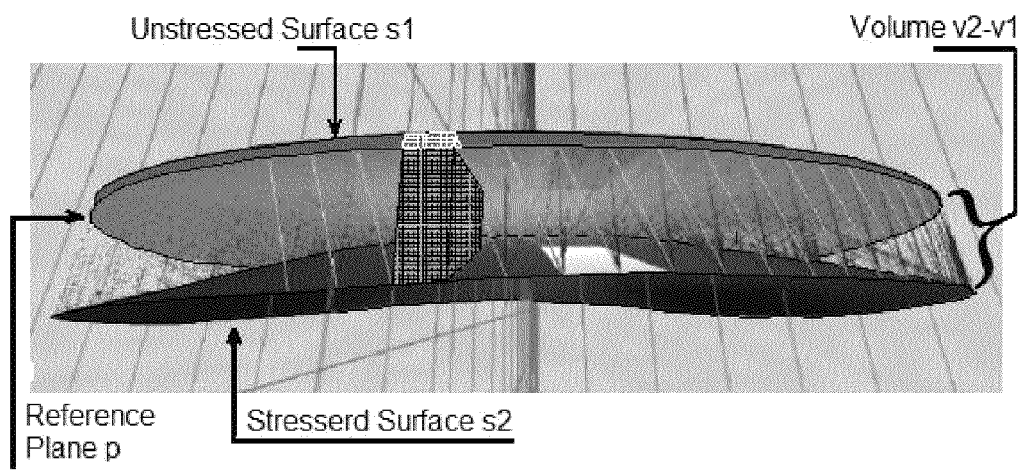
FIG. 2 is the captured image of the (unstressed and stressed) anisotropic substrate in FIG. 1, oriented with the notch at 171 degrees. Calculating thin film stress from curvature at 171 degrees where $R_1=242.8$ m and $R_2=-24.4$ m, resolving −493 Mpa, (a difference of 179 Mpa compared to FIG. 1). Calculating thin film stress from volume, resolves −575 Mpa, as in FIG. 1, due to the unchanged volume difference ($V_2-V_1$).

A new unstressed (no film deposited) 'prime' substrate is relatively flat ('prime' refers to the substrate specifications). Silicon is most spherical when it is unstressed, as if part of a large sphere. Anisotropic materials deform into less spherical shapes as stress increases. Generally, an anisotropic (silicon) substrate deforms from a (relatively) flat unstressed shape into a saddle shape as stress increases, making the results, from curvature, less accurate as stress increases. An actual anisotropic silicon substrate is shown at different angles in FIG. 1 and FIG. 2, illustrating the inaccuracy of (2) Stoney Curvature method as the stress measurement changes from −672 Mpa at 261 degrees to −493 Mpa at 171 degrees, (a difference of 179 Mpa) while the 'stress calculated from volume' is an unchanging −575 Mpa at any orientation or angle.

Other parameters such as bow height (BH) and warp are used to describe specifications of a substrate. The same inaccuracy in BH occurs when deriving BH from substrate curvature or radius from the following equation:

(3) BH from R $$BH = R \pm \sqrt{R^2 - r^2} \quad (3)$$

R=substrate surface 'radius of curvature', r=substrate diameter/2

Calculating the BH from volume is a more accurate description of the substrate using:

(4) BH from V $$BH = (2V/r^2\pi) \quad (4)$$

Simply stated, Bow Height (Bow or Warp) is used to describe a stressed substrate. BH from curvature can be changed by relocating (rotating) the substrate in order to find a more or less flatter surface whereas using BH from volume resolves stable, unchanging values (that resolve radius, bow height and stress) in any orientation, providing an accurate substrate measurement and description. Substrate BH from volume, is calculated with equation (4) BH from V using volume within the geometric container FIG. 4, 4c (unstressed volume) or 4e (stresses volume).

Figure 3:
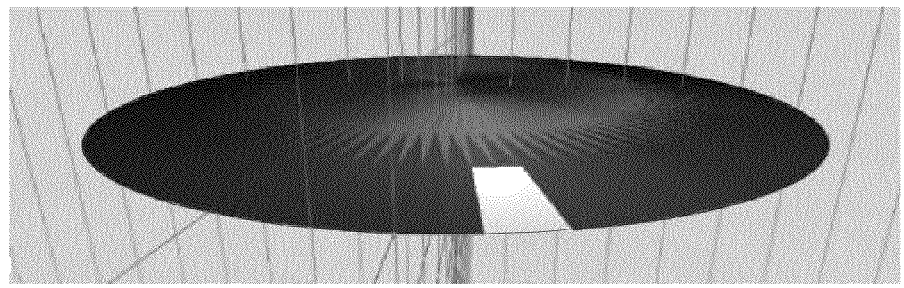
FIG. 3 is identical to FIG. 2 with the magnification set to 1×, illustrating the deformation is not obvious, leading to the misunderstanding that the deformation of a stressed anisotropic material (eg: silicon) is spherical, when it's not.
Figure 3A:
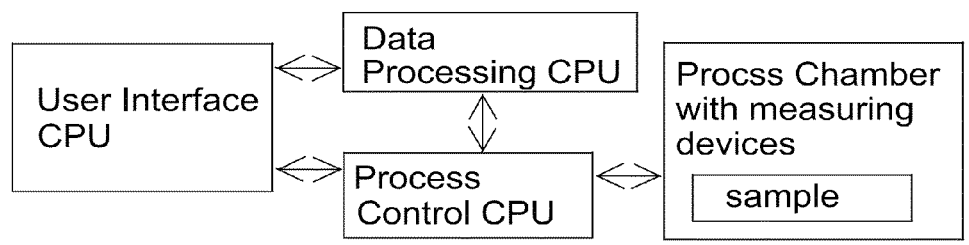
FIG. 3A is an example of a device for measuring thin film stress from volume displaced. The user interface is a computer, the data processing CPU collects points from the substrate before and after film deposition and calculates thin film stress for the user. The process control CPU handles image projection (eg. laser), image detection and substrate handling. The substrate sample is in the process chamber on 3 supports separated by 120 degrees. The detector assembly from FIG. 5 is mounted to the top of the process chamber.

Viewing semiconductor substrates in the 3D IME (FIG. 1) expedites a clear unambiguous understanding of anisotropic deformation, volume difference technique and how non-spherical deformation resolves inaccurate stress measurements from surface curvature. Surface shape of semiconductor substrates is not obvious due to the magnitude of height deformation compared to the length and width. The substrate appears flat in 3 equally magnified dimensions whatever the deformed shape as illustrated in FIG. 3. Generally, Using curvature to measure thin film stress on silicon is based on the belief that deformation is spherical (or closely spherical) because the user cannot see the deformed (non spherical) shape.

SUMMARY

The stress in a thin film deposited on a substrate is calculated from the force required to deform the substrate. This claimed method and apparatus transpose a material surface, deformed from stress, into 'resettled volume difference ($V_2-V_1$). The volume ($V_2-V_1$) is within a geometric container occluded by the material surface. The material shape deforms from stress, such as thin film stress from film deposition in semiconductor manufacturing, changing the volume difference ($V_2-V_1$) value. Stress is resolved with an equation such as:

(5) Stoney Volume (Volume Difference Technique, VDT)

$$\sigma = \left(\frac{ct_s^2}{6t_f}\right) \times \left(\frac{4}{r^4\pi}\right) \times (V_2 - V_1) \quad (5)$$

eg: $\sigma =$ $$\left(\frac{180500 \times 0.55_s^2}{6 \times 6000a \times 0.0000001}\right) \times \left(\frac{4}{50^4\pi}\right) \times (245.4 - (-24.5)) = 834 \text{ Mpa}$$

The claimed apparatus uses the location of a target projected onto a sensor that is reflected from the surface of the subject material (eg: silicon substrate) before and after a thin film has been deposited onto its surface. Equation (5) Stoney Volume uses resettled volume difference and can be described as the difference of volume ($V_2-V_1$) where ($V_1$) is the volume within a geometric container occluded with the unstressed material surface and ($V_2$) is the volume in the same geometric container, with the material surface in a stressed state (eg: stressed from film deposition to calculate thin film stress). The VDT accuracy can be 1×, 2×, 3× or more. Defining VDT-1× as two (2) sets (or paths) of points in three (3) dimensional {xyz} space (where a point in each set is the same, common point such as FIG. 4 and is referred to as 'Basic VDT' or 'VDT-1×'. The degree (or name) of VDT accuracy (eg: 1×, 2×, 3×, . . . etc) is half the number of sets (of points) used (eg: volume calculated from 8 point sets=VDT-4×). The reference plane in this discussion is tangent to the center of the substrate surface (however it can be anywhere). Increase the VDT accuracy (ie: more points or sets) for improved topography, shape, volume and stress accuracy.

The paradigm to thin film stress measurement using resettled volume difference concludes that anisotropic and isotropic material stress can (both) be measured accurately from the resettled volume difference in a geometric container occluded with the material surface, whereas only isotropic material stress can be calculated from curvature of a material surface (Brokers Law). The resettled Volume Difference Technique (VDT) uses an equation, (such as equation (5) Stoney Volume) associated to ($V_2-V_1$) and an apparatus (such as a Surface Deformation Detector in FIG. 5) to derive shape and volume ($V_1$ and $V_2$). Equation (5) Stoney Volume includes a geometric container with the volume difference ($V_2-V_1$). The geometric container occludes the volume with the material surface (eg: semiconductor substrate) that deforms with stress. An isotropic (spherical) surface facilitates resolving (and verifying) the integrity of the geometric container using equation (2) Stoney Curvature to measure stress. An anisotropic material can be accurately measured in the same (verified) system using the VDT equation and apparatus. The geometric container in equation (5) Stoney Volume is for substrates that fit in the system. Cavalieri's Principle (method of indivisibles) is germane to isotropic and anisotropic material volume difference from stress deformation. The VDT system (equation and apparatus) resolves accurate, repeatable stress measurement values in any orientation, fostering its paradigm.

DETAILED DESCRIPTION OF INVENTION

This invention (generally) is a solution for measuring thin film stress of anisotropic materials such as silicon used in semiconductor manufacturing. This invention accurately measures stress of isotropic and anisotropic materials. Measuring thin film stress from the radius of curvature (ROC) of anisotropic materials (such as silicon) is a lottery drawing from a range of non-spherical surface curvature values where the range grows as the stress increases. The resettled volume difference technique (VDT) (method and equation) has greater accuracy regardless of the material type (isotropic or anisotropic) or stress value. The apparatus uses an assembly, such as FIG. 5, that accurately collects 3D surface points of a material without touching the surface by reflecting a target (illuminated or not) from the substrate onto a sensor (eg: 2D sensor) as shown in FIG. 5 the $3r^d$ dimension is the position of the image on the substrate. This example uses a reference plane (p) tangent to the substrate center point. A volume cell is within the smallest perimeter of points on the substrate surface (s1) or (s2) and corresponding points on the reference plane. The sum of the volume cells between (s1) and (p) equals ($V_1$). The sum of the volume cells between (s2) and (p) equals ($V_2$). Accuracy improves with smaller volume cells (ie: more 3D substrate surface points).

Figure 4:
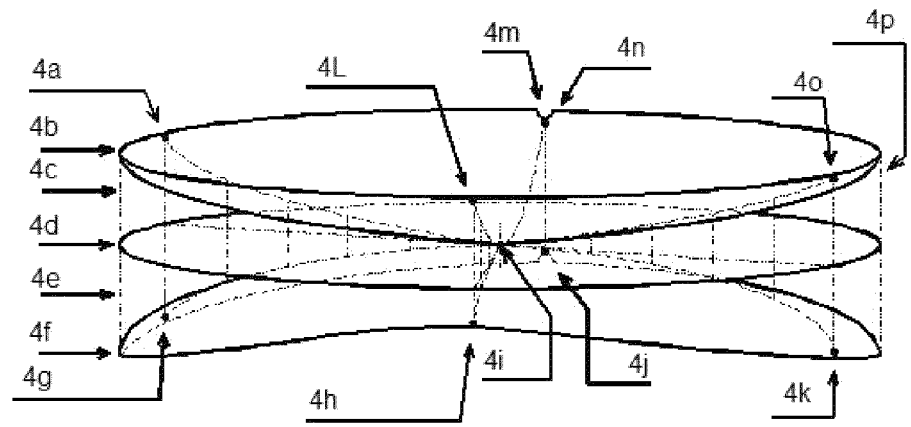
FIG. 4 is the 'Basic Volume Difference Technique Model' with the height axis magnified 200×. The unstressed surface height is magnified more to better illustrate the surfaces. The illustration shows an unstressed surface referred to as s1, a stressed surface referred to as s2, a reference plane referred to as p, the circumscribed cylindrical perimeter, the '0 degree set of points', the '90 degree set of points' and the 'Basic VDT' 3D {xyz} point locations at the substrate center and edge. Note that the 0 and 90 degree set of points can be 3 points or thousands of points for larger or smaller volume cells with faster measurements or better accuracy. The unstressed shape illustrates a spherical surface, whereas, the stressed shape illustrates an anisotropically deformed surface. The legend follows.

One point (common point) on all three models (p, s1 and s2) is related (ie: the same), in a 3D coordinate system. The common point, in this discussion, is the center of the geometric models (p, s1 and s2). The method to calculate VDT stress is:

A) Calculate 3D points on an unstressed substrate surface (before film deposition) using an apparatus, such as FIG. 5. Collect 3D positions in FIG. 4: location 4L, 4i, 4n, 4o, 4i and 4a (at minimum) and create a first surface model (s1) and reference plane (p).
B) Determine the first volume ($V_1$) contained within the unstressed surface (s1), the reference plane (p) and the circumscribed cylindrical perimeter (c).
C) Deposit a film onto the substrate (ie: apply stress to the material used to calculate the unstressed (s1) shape).
D) Calculate 3D points for the stressed substrate surface and create a second surface model (s2) (same locations collected in A (above), with a different height value). FIG. 4: location 4h, 4i, 4j, 4k, 4i and 4g.
E) Determine the second volume ($V_2$), contained within the stressed surface (s2), the reference plane (p), and the circumscribed cylindrical perimeter (c).
F) Calculate the stress using $V_1$ and $V_2$ in equation (5) Stoney Volume.

This claim is:

1. A method of collecting three dimensional points on a substrate, comprising:

projecting a target onto the surface of said substrate;
sensing a reflected light from the surface of said substrate with a sensor;
calculating three dimensional points on a unstressed substrate surface so as to produce a first surface model and a reference plane;
determine a first volume contained within said unstressed substrate surface, said reference plane, and a circumscribed cylindrical perimeter;
deposit a film onto the surface of said substrate;
calculating three dimensional points for a stressed substrate surface so as to produce a second surface model;
determine a second volume contained within said stressed surface, said reference plane, and said circumscribed cylindrical perimeter;
calculate the volume of the substrate from the first and second volume.

* * * * *

UNITED STATES PATENT AND TRADEMARK OFFICE
CERTIFICATE OF CORRECTION

PATENT NO.        : 8,625,083 B2
APPLICATION NO.   : 13/046722
DATED             : January 7, 2014
INVENTOR(S)       : Ken Roberts It is certified that error appears in the above-identified patent and that said Letters Patent is hereby corrected as shown below:

In the Claims
Column 8, lines 5-23, Claim 1:

This claim should read:
1. A method of collecting three dimensional points on a substrate, comprising:
projecting a target onto the surface of said substrate;
sensing a reflected light from the surface of said substrate with a sensor;
calculating three dimensional points on an unstressed substrate surface so as to produce a first surface model and a reference plane;
determine a first volume contained within said unstressed substrate surface, said reference plane, and a circumscribed cylindrical perimeter;
deposit a film onto the surface of said substrate;
calculating three dimensional points for a stressed substrate surface so as to produce a second surface model;
determine a second volume contained within said stressed surface, said reference plane, and said circumscribed cylindrical perimeter;
calculate the stress from the first and second volume.

Signed and Sealed this
Twenty-ninth Day of April, 2014

Michelle K. Lee
*Deputy Director of the United States Patent and Trademark Office*